Aug. 23, 1966 G. W. STANTON ETAL 3,268,622
COMPOSITIONS COMPRISING GRAFT COPOLYMERS OF CERTAIN MONOMERIC
POLYGLYCOL ESTERS OF ACRYLATES AND METHACRYLATES
ON POLYESTER SUBSTRATES
Filed June 22, 1962

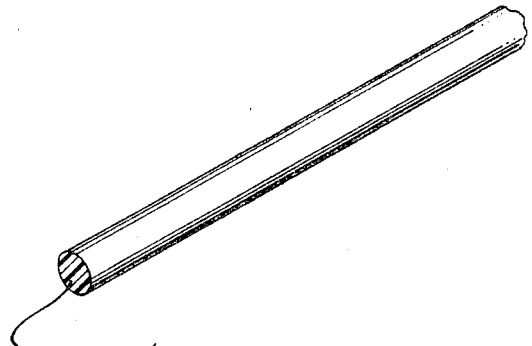

Filamentous article comprising a graft copolymer of certain monomeric polyglycol esters of acrylates and methacrylates on a polyester polymer substrate.

INVENTORS.
George W. Stanton
BY Teddy G. Traylor

Griswold & Burdick
ATTORNEYS 3,268,622
COMPOSITIONS COMPRISING GRAFT COPOLY-
MERS OF CERTAIN MONOMERIC POLYGLYCOL
ESTERS OF ACRYLATES AND METHACRY-
LATES ON POLYESTER SUBSTRATES
George W. Stanton, Walnut Creek, and Teddy G. Traylor,
Del Mar, Calif., assignors to The Dow Chemical Com-
pany, Midland, Mich., a corporation of Delaware
Filed June 22, 1962, Ser. No. 206,128
4 Claims. (Cl. 260—873)

This application is a continuation-in-part of copending application for United States Letters Patent having Serial No. 711,940, filed January 29, 1958, now abandoned.

The present invention lies generally in the field of organic chemistry and contributes in particular to the art which pertains to synthetic, fiber-forming high polymers. More particularly, the present invention has reference to the provision of certain hydrophilic graft or block-type copolymers exhibiting improved dyeability and reduced static charge that are comprised of certain monomeric polyglycol esters of acrylates and methacrylates polymerized on polyester polymer substrates.

Hydrophobic polymeric materials of varying origin are commonly employed in the manufacture of various synthetic shaped articles including films, ribbons, fibers, filaments, yarns, threads and the like and related structures, which hereinafter will be illustrated with particular reference to fibers. Polyester polymers may be utilized with great advantage for such purposes.

The fiber-forming, resinous polyester polymer substrates that are contemplated as being adapted for employment in the practice of the present invention include any of the polyester high polymers of the type that are well known in the art and which are capable of being fabricated into useful fiber, film and related structures. Such fiber-forming polyester polymers, which, for convenience, will hereinafter be referred to as "polyesters," are the essentially linear condensation products of glycols and polyglycols with dicarboxylic organic acids, which acids are ordinarily aromatic in nature as, for example, dicarboxylic acids of benzenes, naphthalenes, diphenylenes, coupled aromatic nuclei and the like. Suitable polyesters may also be formed from the self-condensation of hydroxy alkyl and hydroxy alkoxy benzoic acids. In particular, the polyester polymers that are contemplated may be similar and analogous to those which have been described, amongst the other places, in United States Letters Patent No. 2,465,319. Specifically, there may be mentioned as especially desirable species of such materials, the polyester polymers of terephthalic acid and trimethylene or ethylene glycol, or their mixtures. Polymer substrates in synthetic textile fiber form that are comprised of polyester polymers of terephthalic acid and ethylene glycol are commercially available under the tradename "Dacron." Films of a similar polymer are commercially available under the trade-name "Mylar."

Difficulty, however, is often encountered in suitably dyeing synthetic hydrophobic fibers and the like that have been prepared from polyester polymers. This is especially the case when it is attempted to obtain relatively deeper shades of coloration in the finally dyed product.

Various techniques have been evolved for providing polyester polymer compositions of improved dyeability. The practice of such techniques has not always been completely satisfactory. Neither have the products achieved thereby always provided a completely suitable solution to the problems involved. For example, many of the fiber products which are prepared in accordance with the above-identified techniques known to the art often have inferior physical properties when they are compared with those prepared from unmodified polyesters. Also, such products, once they have been prepared, may not be as receptive as might be desired to a wide range of dyestuffs, due to inherent limitations in the materials capable of being employed for enhancing dye-receptivity.

It would be advantageous, and it is the chief aim and concern of the present invention, to provide polyester polymers which have been modified with certain graft or block copolymerized substituents so as to be exceptionally dye-receptive while being capable of being fabricated into fibers and the like and related shaped articles having excellent physical properties and other desirable characteristics commensurate with those obtained with the unmodified polyester substrates, and of the general order obtainable with "Dacron," for example. This would possibilitate the manufacture of polyester polymer based fibers and the like articles having the highly desirable combination of attractive physical characteristics and substantial capacity for and acceptance of dyestuffs.

To the attainment of these and related ends, a dye-receptive polymer composition that is adapted to provide shaped articles having excellent physical properties and characteristics while being simultaneously receptive of and dyeable to deep and level shades of coloration with many of a wide variety of dyestuffs is, according to the present invention, comprised of a fiber-forming graft or block copolymer which consists of a polyester polymer substrate having a minor proportion of substituents graft copolymerized thereto that are comprised or consist essentially of polymerized units that have been derived from certain monomers, monomeric polyglycol esters of acrylates and methacrylates, hereinafter identified.

Schematically, the compositions may be structurally represented in the following manner:

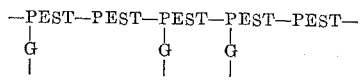

wherein the interlinked "PEST" symbols represent the polyester polymer substrate or trunk and the symbols "G" connected thereto the substituent graft copolymer branches of the indicated variety of monomer provided thereon.

As is apparent, the graft copolymer substituent that is combined with the polyester polymer substrate lends the desired receptivity of and substantivity for various dyestuffs to the compositions while the polyester polymer trunk substrate that is so modified facilitates and secures the excellent physical properties and characteristics of the various shaped articles, including fibers into which the compositions may be fabricated. Advantageously, as mentioned, the polyester polymer substrate that is modified by graft copolymerization to provide the compositions of the invention is a resinous, fiber-forming condensation product of terephthalic acid with ethylene glycol, other $\alpha,\omega$-glycols, and preferably $\alpha,\omega$-glycols of from 2 to 4 carbon atoms, or mixtures of such glycols.

It is usually beneficial, as has been indicated, for the graft copolymer compositions of the present invention to contain a major proportion of the polyester polymer trunk or substrate that has been modified with the substituent dye-receptive graft copolymer groups chemically attached thereto. As a general rule, for example, it is desirable for the graft copolymer to be comprised of at least about 80 percent by weight of the polyester polymer substrate. In many instances, it may be satisfactory for the graft copolymer composition to be comprised of between about 85 and 95 percent by weight of the polyester polymer substrate, particularly when it is "Dacron" or the like resinous product. In this connection, however, better dyeability may generally be achieved when the grafted copolymeric substituents are prepared under such conditions that they have relatively long chain lengths. Thus, it is usually preferable, when identical quantities of grafted substituents are involved, for relatively fewer, but longer chain length grafts to be available than to have a greater number of substituents of relatively shorter chain length.

The monomeric polyglycol esters of acrylic and methacrylic acids which are used to modify the polyester substrates so as to provide the graft copolymer compositions of the present invention may be any of those (or their mixtures) of the structural formula:

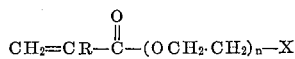

wherein R is selected from the group consisting of hydrogen and methyl radicals; X is selected from the group consisting of halogen; hydroxyl, alkoxy (1 to 4 carbon atoms), acrylate and methacrylate radicals; and $n$ has an average numerical value of 2 to 200, advantageously from 10 to 50.

As mentioned, the graft copolymer compositions of the invention have remarkably good dye-receptivity, particularly in view of their polyester polymer origin. In most cases, for example, the dye-receptivity of the graft copolymer compositions of the present invention is improved to such an extent in comparison with unmodified polyester polymers, particularly unmodified "Dacron," that a color differential of at least about 40 Judd units, as hereinafter illustrated, may readily be obtained between samples of the unmodified polyester polymer substrate and the graft copolymer compositions of the present invention, each of which have been dyed at a 4 percent dyeing, according to conventional techniques with such a dyestuff as Amacel Scarlet BS. This is a significant advantage when the compositions are fabricated into shaped article form, especially when they are prepared in a filamentary form suitable for use as a textile material.

The Judd unit referred to in the foregoing is described and defined by D. B. Judd in an article in the "American Journal of Psychology," vol. 53, page 418 (1939). More applicable data appears in "Summary on Available Information on Small Color Difference Formulas," by Dorothy Nickerson in the American Dyestuff Reporter, vol. 33, page 252 (June 5, 1944). See also, "Interrelation of Color Specifications," by Nickerson in the "Paper Trade Journal," vol. 125, page 153 for November 6, 1947.

Besides having excellent physical properties and other desirable characteristics, fibers and the like articles comprised of the present compositions similarly have the indicated high capacity for being readily and satisfactorily dyed to deep and level shades of coloration with many dyestuffs. For example, fibers of the present compositions may be easily and successfully dyed according to conventional procedures using vat, acetate, naphthol, and sulfur dyes. Such dyestuffs, in addition to the particular variety mentioned, by way of didactic illustration, as Calcocid Alizarine Violet (Colour Index 61710, formerly Colour Index 1080), Amacel Scarlet BS (American Prototype Number 244 or Colour Index Dispersed Red 1 or 11110), Sulfanthrene Red 3B (Colour Index Vat Violet 2), Naphthol ASMX (Colour Index 35527), Fast Red TRN Salt (Colour Index Azoic Diazo 11), and Immedial Bordeaux G (Colour Index Sulfur Brown 12) may advantageously be employed for such purposes.

Other dyestuffs, by way of further illustration, that may be utilized beneficially on fiber products of the dye-receptive graft copolymer compositions of the invention include such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), and Sulfanthrene Blue 2B Dbl. Paste (Colour Index Vat Blue 5), and Sulfanthrene Red 3B Paste (Colour Index Vat Violet 2); Indigosol Green IB Powder (Colour Index Vat Green 1), a soluble vat dyestuff; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BR Conc. (both Colour Index Dispersed Red 15), Celanthrene Pure Blue BRS 400 percent (Colour Index Dispersed Blue 1) and Acetamine Yellow N (Colour Index Dispersed Yellow 32); and the like.

The dyed products, especially textile fiber products, are generally lightfast and are well imbued with good resistance to crocking. A shaped filamentary article prepared from a dye-receptive composition in accordance with the present invention is schematically illustrated in the sole figure of the hereto annexed drawing.

The dye-receptive graft copolymers of the present invention may be prepared and provided by swelling or impregnating the polyester polymer substrate with the monomeric substance then polymerizing the monomer in situ in the polymer substrate. Advantageously, this may be accomplished when the substrate is in the form of an already shaped article, such as a fiber or filamentary structure. Beneficially, the graft copolymerization of the impregnated monomer may be accomplished and facilitated with the assistance of a polymerization catalyst or catalyzing influence which, preferentially, interacts with the substrate in order to establish or form grafting sites thereon and simultaneously or subsequently initiate the graft copolymerization. As a practical matter, it is generally most desirable to form the graft copolymer compositions in such manner. Most of the free radical generating chemical catalysts, including peroxide and persulfate catalysts, may be utilized for the desired graft copolymerization. It may often be exceptionally advantageous, however, to accomplish the graft copolymerization by subjecting the monomer-impregnated polyester polymer substrate to a field of high energy radiation in order to efficiently provide an effectively attached graft copolymer of the polymerized monomeric impregnant on the hydrophobic polyester polymer substrate.

The monomer may be intimately impregnated in the polyester polymer substrate in any desired manner prior to the graft copolymerization. Thus, the monomer may be directly applied, particularly when it has a swelling effect on the substrate, or it may be applied from dispersion or solution in suitable liquid vehicles, preferably those tending to swell the polymer, until a desired monomer content has been obtained. Ordinarily, it is advantageous for the monomer to be diluted in a solvent or dispersant vehicle so as to provide a treating bath in which to swell or impregnate the polyester polymer substrate with the latter being immersed in the bath for a sufficient period of time to attain a desired monomer content adequate for the intended purpose. The polyester polymer substrate, as has been mentioned, may be in any fabricated or unfabricated form. Unfabricated graft copolymer compositions in accordance with the present invention may be converted to shaped articles by any desired technique adapted for such purpose with conventional polymers. It is generally desirable and of significant advantage, however, to impregnate a preformed article, such as a textile fiber of the polyester polymer (or a cloth or fabric comprised thereof) with the monomer in order to prepare the graft copolymer compositions of the invention.

In this connection, particularly when preformed fiber structures are involved, the article may be in any desired state of formation for the impregnating and graft copolymerizing modification. Thus, fibers and films may be treated before or after any stretch has been imparted thereto. In addition, they may be in various stages of orientation, or in a gel, swollen or dried condition.

The impregnation and succeeding polymerization may, in general, be effected at temperatures between about 0° C. and about 200° C. for periods of time ranging up to 4 or more hours. The most suitable conditions in each instance may vary according to the nature and quantity of the specific monomeric impregnant involved and the graft copolymerizing technique that is utilized. For example, when chemical catalysts are employed for purposes of forming the graft copolymer, a temperature of between about 50° and 100° C. for a period of time between about 15 and 45 minutes may frequently be advantageously employed for the purpose. Under the influence of high energy radiation, however, it may frequently be of greatest advantage to accomplish the graft copolymerization at temperatures between about 20 and 60° C. utilizing relatively low dose rates and total dosages of the high energy for the desired purpose. Graft copolymerization on pre-activated substrates may ordinarily be accomplished by simply exposing the activated substrate to the monomer (preferably in concentrated solution) at an elevated temperature until the graft copolymerized substituents have formed on the substrate.

When the graft copolymer compositions are prepared from preformed or already shaped polyester polymer substrates that are successively impregnated with the monomer, which is then graft copolymerized in situ in the shaped article, excess monomer, if desired, may be squeezed out or removed in any suitable manner prior to effecting the graft copolymerization.

The chemical free radical generating catalysts which may be employed with greatest advantage in the preparation of the graft copolymer compositions of the present invention include hydrogen peroxide, benzoyl peroxide, cumene hydroperoxide, ammonium or potassium persulfate and the like. Such catalysts may be used in conventional quantities to effect the graft copolymerization. When they are utilized, it is of greatest benefit to incorporate them in the impregnating solution of the monomer that is used.

The high energy radiation which may be employed for inducing the graft copolymerization for the preparation of the graft copolymers of the present invention is of the type which provides emited particles or photons having an intrinsic energy of a magnitude which is greater than the planetary electron binding energies that occur in the graft copolymerizing materials. Such high energy radiation is available from various radioactive substances which provide beta or gamma radiation as, for example, radioactive elements including cobalt-60 and cesium-137, nuclear reaction fission products and the like. If it is preferred, however, high energy radiation from such sources as electron beam generators, including linear accelerators and resonant transformers, X-ray generators and the like may also be utilized. It is beneficial to employ the high energy radiation in a field of at least about 40,000 roentgens per hour intensity. A roentgen, as is commonly understood, is the amount of high energy radiation as may be provided in a radiation field which produces in one cubic centimeter of air at 0° C. and 760 millimeters of absolute mercury pressure, such a degree of conductivity that one electrostatic unit of charge is measured at saturation (when the secondary electrons are fully utilized and the wall effect of the chamber is avoided). It is most desirable, incidentally, to graft copolymerize all or substantially all of the monomeric impregnant to and with the polyester polymer substrate being modified in order to provide the compositions of the present invention. In addition, as has been indicated, particularly when preactivation of the substrate is performed, ultraviolet light may also be employed as the high energy radiation form. Preactivation or graft site formation with oxygen and ultraviolet light or ozone may also be satisfactory in some instances.

For purposes of specifically illustrating, without intending to thereby limit the invention, the following didactic examples are provided wherein, unless otherwise indicated, all parts and percentages are to taken by weight.

*Example 1*

A sample of cloth woven from polyethylene terephthalate ("Dacron") yarn was scoured and soaked for about an hour at 75° C. in about a 40 percent aqueous dispersion of a monomer of the structure:

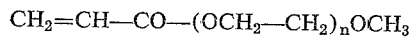

wherein $n$ had an average value of about 18 being derived from a polyethylene glycol ether of 600 molecular weight. The polymer was thereby impregnated with about 10 percent of the monomer. The wet fiber was then exposed at a distance of about 1 centimeter from a Machlett OEG-50 tube that was being operated at 50,000 volts at 50 milliamperes. The exposure was continued for 25 minutes. The irradiated yarn was then washed thoroughly with water, dried, scoured and dyed for one hour at the boil with 4 percent (on the weight of the fiber and according to the conventional technique) of Amacel Scarlet BS. A deep and level shade was obtained in the irradiated portion. The remainder of the cloth sample, however, was not even stained by the dyestuff.

*Example 2*

The procedure of Example 1 is repeated excepting to impart a 10 m.r.e.p. (million roentgen equivalent physicals) dosage of 1 m.e.v. electrons at a 70 m.r.e.p. per minute rate from a Van de Graaff electrostatic generator to the radiated portion of the cloth sample. Similar excellent results are obtained.

*Example 3*

The procedure of Example 1 is repeated excepting to accomplish the irradiation with a one million electron volt resonant transformer. Similar excellent results are obtained in the graft copolymerized fiber product.

Results similar to the foregoing may also be obtained when any other of the mentioned varieties of monomers of the type having a structure according to that indicated in the foregoing specification are utilized in a similar manner in place of those set forth in the above examples and when graft copolymers are prepared with such monomers on unfabricated forms of the polyester polymer substrate, or when the graft copolymerization is accomplished with other varieties of polyester polymers besides those used for purposes of didactic illustration.

What is claimed is:

1. Dye-receptive graft copolymer composition comprised of (1) a polyester polymer substrate which is a fiber-forming polymer having as an essential ingredient in the polymer chain recurring units of an aromatic nucleus having chemically attached thereto to carbon atoms therein up to about 20 weight percent, based on the weight of the composition, as graft copolymerized substituents thereon, (2) polymerized units of a monomer of the formula:

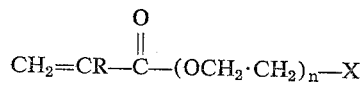

wherein R is a radical selected from the group consisting of hydrogen and methyl; X is selected from the group consisting of halogen; hydroxyl (1 to 4 carbon atoms)

alkoxy, acrylyloxy and methacrylyloxy radicals; and $n$ has an average numerical value of 2 to 200.

2. The composition of claim 1, wherein said polyester polymer substrate has between about 5 and 15 percent by weight, based on the weight of the composition, of said substituent graft copolymerized units attached thereto.

3. The composition of claim 1, wherein said polyester polymer substrate is a resinous condensation product of terephthalic acid and an $\alpha,\omega$-glycol of from 2 to 4 carbon atoms.

4. A filamentary shaped article comprised of the composition set forth in claim 1.

No references cited.

JOSEPH L. SCHOFER, *Primary Examiner.*

DONALD E. CZAJA, *Examiner.*

H. WONG, JR., *Assistant Examiner.*